UNITED STATES PATENT OFFICE.

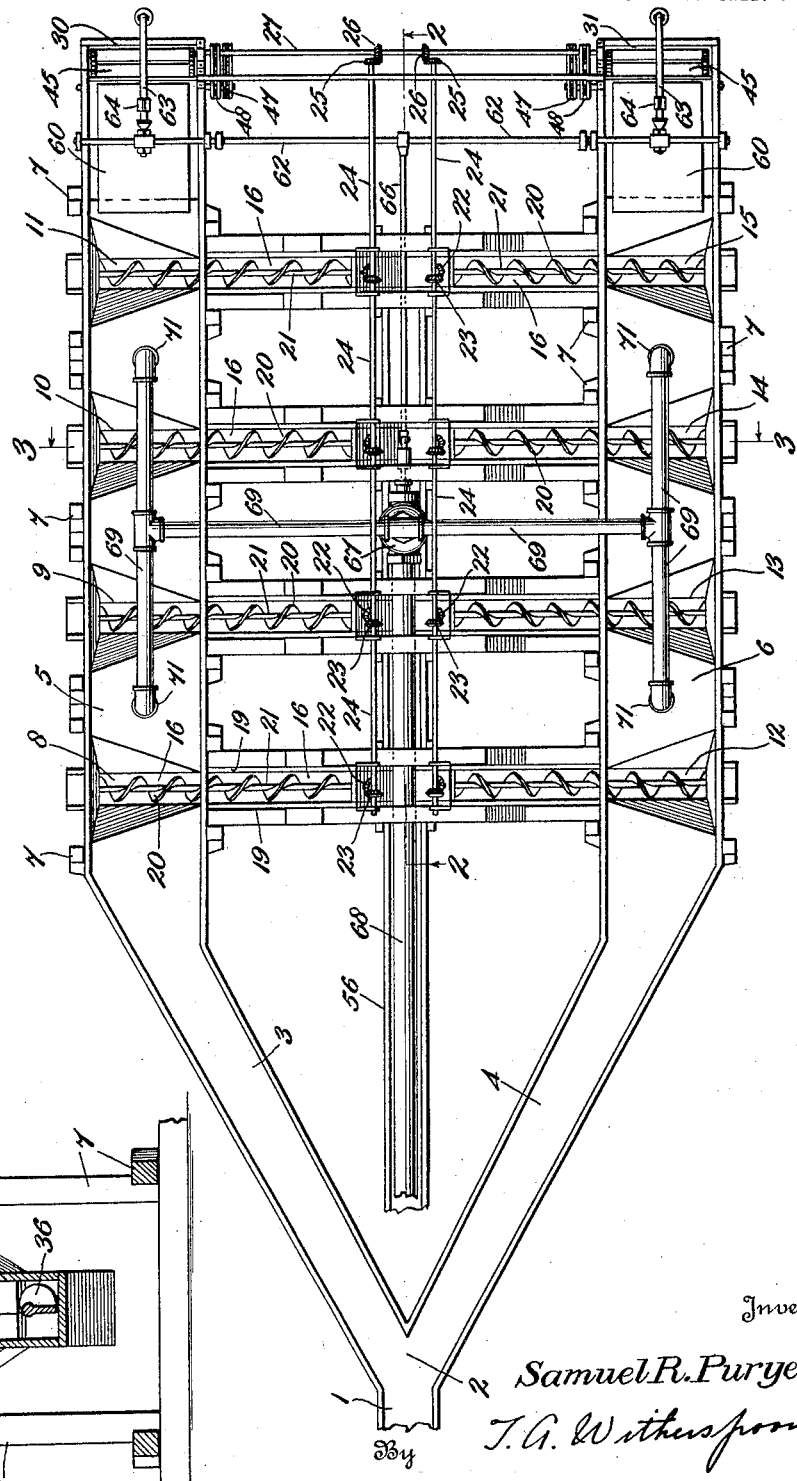

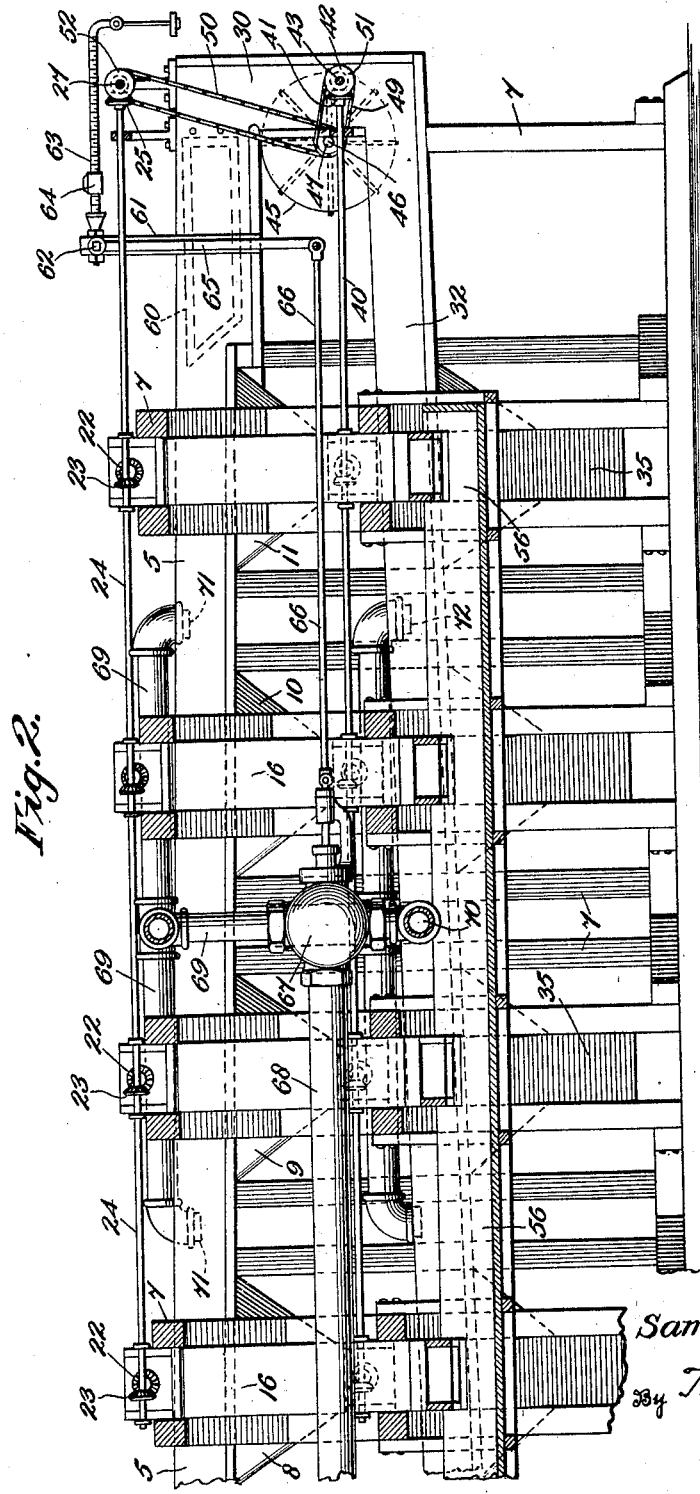

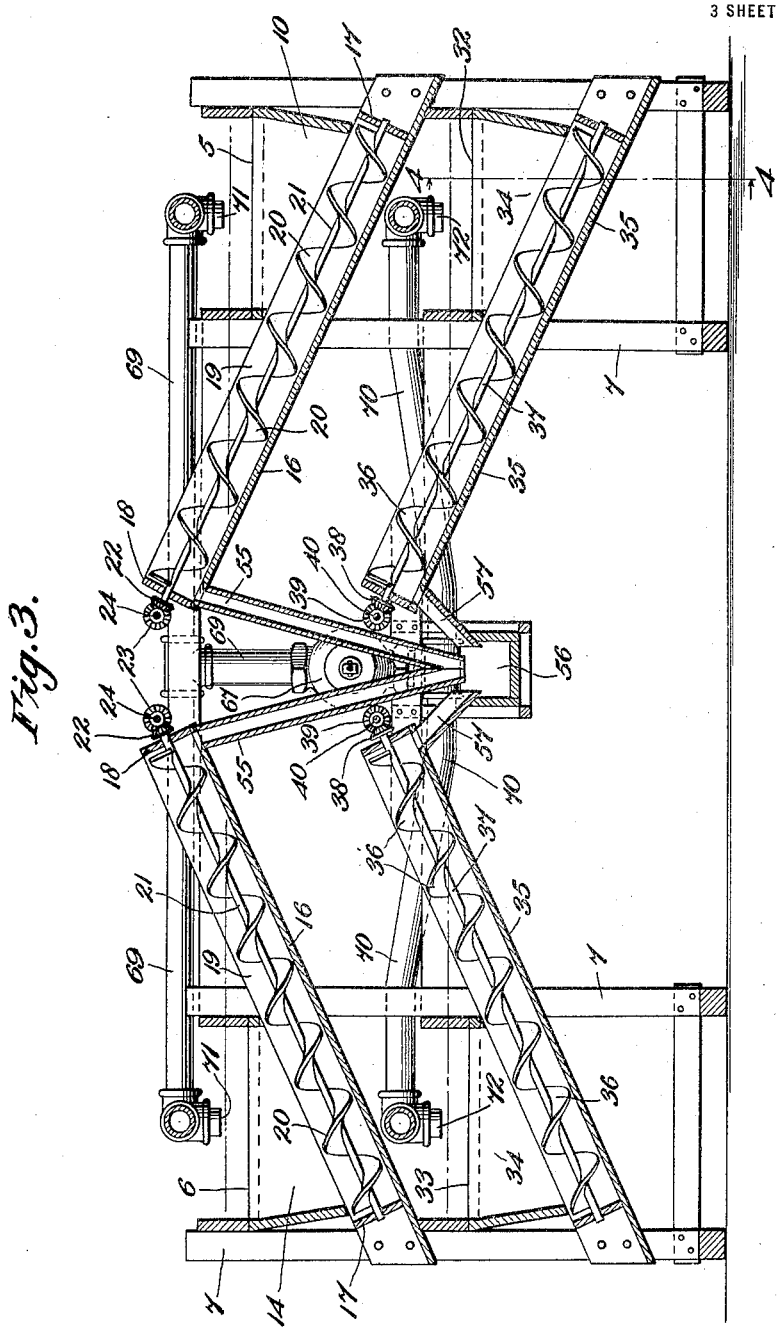

SAMUEL R. PURYEAR, OF COLUMBIA, TENNESSEE.

APPARATUS FOR SEPARATING SOLIDS FROM LIQUIDS.

1,400,980.

Specification of Letters Patent. Patented Dec. 20, 1921.

Application filed March 5, 1921. Serial No. 449,868.

*To all whom it may concern:*

Be it known that I, SAMUEL R. PURYEAR, a citizen of the United States, residing at Columbia, in the county of Maury and State of Tennessee, have invented certain new and useful Improvements in Apparatus for Separating Solids from Liquids; and I do hereby declare the following to be a full, clear, and exact description of the invention, such as will enable others skilled in the art to which it appertains to make and use the same.

This invention relates to apparatus for separating solids from liquids, and has for its object to produce a mechanism of this character which will be simple in construction, comparatively inexpensive to manufacture, and more efficient in action than those heretofore proposed.

With these and other objects in view, the invention consists in the novel details of construction and combinations of parts more fully hereinafter disclosed and particularly pointed out in the claims.

Referring to the accompanying drawings, forming a part of this specification, in which like numerals designate like parts in all the views:

Figure 1 is a diagrammatic plan view of an apparatus made in accordance with the present invention;

Fig. 2 is a diagrammatic central vertical sectional view taken approximately on the line 2—2 of Fig. 1, looking in the direction of the arrows;

Fig. 3 is a vertical transverse sectional view taken approximately along the line 3—3 of Fig. 1; and Fig. 4 is a fragmentary, vertical, sectional view taken approximately on the line 4—4 of Fig. 3.

In working with phosphatic and other materials it frequently occurs that the solid material is for certain purposes mixed with a large volume of water or other fluid and after certain treatment of the mixture it becomes desirable to separate the solids from the liquids. It is also frequently desirable in accomplishing such separation to segregate the heavier solids from the lighter, as well as the larger particles from the smaller, and it is to accomplish such separation and classification that the present apparatus is intended.

Referring more especially to Fig. 1 of the drawings, 1 indicates any suitable trough adapted to receive the mixture of solid and liquid materials, which trough may divide as at 2 into the branches 3 and 4 leading to the inclined upper trough members 5 and 6 respectively, which may be supported upon any suitable frame work 7 of wood or metal as may be desired. The trough 1 is preferably adapted to receive the material from some preceding machine which will discharge it at a sufficient height to provide a head, whereby the mixture of solids and liquids will be caused to flow along the troughs from left to right as seen in Figs. 1 and 2, as will be readily apparent. The trough 5 is provided with a plurality of depressions 8, 9, 10 and 11, while the trough member 6 is likewise provided with a set of depressions 12, 13, 14 and 15, as will be clear from the drawings.

These said depressions may be provided with inclined sides substantially as shown and with bottom members 16 extending substantially all the way across the trough members 5 and 6. The said bottom members 16 have associated with them the end members 17 and 18 as well as the side members 19 constituting inclined troughs extending substantially at right angles to the trough members 5 and 6, and in each of which is mounted for rotation a conveyer member such as the screw 20 carried by the shaft 21 extending through the ends 17 and 18 and suitably journaled therein.

As above stated, each of the depressions with which the trough members 5 and 6 are provided have associated with them one of the screw conveyer members 20 and the respective shafts 21 carrying the said screw members 20 carry at or near their upper ends a beveled gear 22 meshing with the beveled gears 23 carried by a pair of shafts 24 extending longitudinally of the apparatus and each provided at or near its right hand end as seen in Fig. 1 with a beveled gear 25 meshing with the beveled gears 26 carried by the transversely extending shaft 27, which may be suitably journaled in the frame work 7. The troughs 5 and 6 at their lowermost ends, as will be clear from Fig. 2, are provided with vertical connections 30 and 31 respectively, leading to the lower trough members 32 and 33, which may be inclined in the opposite direction from the troughs 5 and 6 to produce a flow of the material as will be clear from Fig. 2.

The said lower trough members 32 and 33 may be likewise provided with a plurality of substantially V-shaped depressions similar in all respects to the depressions 8, 9, 10, etc., of the upper trough members 5, 6 and arranged substantially in vertical planes below the said depressions 8, 9, 10, etc. Each of the said depressions 34, with which the lower trough members 32 and 33 are provided may have associated with it a transversely extending inclined trough 35 within which is mounted for rotation the screw conveyer members 36 carried by the shafts 37, provided with the beveled gears 38 meshing with the beveled gears 39 carried by the shafts 40 extending longitudinally of the apparatus and provided with the beveled gears 41 meshing with the beveled gears 42 carried by the transversely extending shaft 43, as will be clear from Figs. 2 and 3.

Each of the vertically disposed connections 30 and 31 between the upper troughs 5 and 6 and the lower troughs 32 and 33 may have associated with it a suitable turbine or other fluid operated wheel such as 45, see Figs. 1 and 2. The said wheel may be suitably mounted upon a shaft 46 which may carry the sprockets 47 and 48 over which pass the chains 49 and 50 respectively transmitting the power through the sprocket wheels 51 and 52 respectively to the transverse shafts 27 and 43, as will be clear from the drawings.

It will thus be seen from what has been thus far disclosed that fluid material may flow through the troughs 5 and 6; when it reaches the vertical connections 30 and 31 it will be caused to contact with the paddles or vanes of the water wheels 45 thereby causing a rotation of the same and supplying power through the shafts 46, sprockets 47 and 48, chains 49 and 50, sprockets 51 and 52, shafts 27 and 43, shafts 24 and 40, and the various beveled gear connections to the screw conveyers 20 for a purpose to be more fully hereinafter disclosed.

The upper ends of the trough members 16 preferably extend above the normal water level maintained in the troughs 5 and 6, and the said ends of the trough 16 are provided with suitable connections 55 discharging into a receiving trough 56. In like manner, the upper ends of the transverse trough members 35 rise above the water level normally maintained in the trough members 32 and 33, and the said upper ends of the troughs 35 are provided with connections 57 also discharging into the longitudinally extending receiving trough 56.

The operation of the apparatus as thus far disclosed will be clear from the foregoing, but may be briefly summarized as follows:

Mixed liquids and solids of any nature being introduced into the trough 1, they will divide, passing along the branches 3 and 4 to the trough members 5 and 6, whereupon they will, of course, fill the V-shaped depressions 8, 9, 12, 13, etc., and will pass by way of the vertical connections 30 and 31 to the lower longitudinally extending trough members 32 and 33, filling their various depressions or pockets 34 in a similar manner. As the various pockets or depressions 8, 9, 10, 13, 14, 34, etc., are filled the solids carried by the liquid will be deposited to a greater or less extent in the said depressions owing to the fact that the mixture contained therein is more or less quiescent, thereby permitting the suspended solids to settle in the bottom of the depressions in the well known manner. Of course, the heavier solids will be the first to be deposited and they will be collected to a greater or less extent in the depressions 8 and 12 of the trough members 5 and 6, while the next heaviest of the solids will be deposited in the trough members 9 and 13, and in like manner the next succeeding pockets will catch the solids having the next highest specific gravities, and on down the line until the last pockets in the lower trough members 32 and 33 will receive the finest and lightest of the suspended solids.

It will thus be seen that while separating out the solid materials from the liquids they are also to a great extent automatically segregated and classified according to their specific gravities, and they may thus be readily removed from the receiving trough 56 to which they finally find their way, as will be presently disclosed, in a more or less segregated condition.

When the solids have thus settled into the V-shaped depressions or pockets of the troughs 5, 6, 32 and 33, the water flowing downwardly through the vertical connections 30 and 31 will impinge upon the paddles or vanes of the water wheels 45 causing the latter to rotate and through the various connections above disclosed power will be transmitted to the shafts 24 and 40 and from the said shafts to the screw conveyer shafts 21 and 37, thereby causing a rotation of the said conveyers. Such rotation will, of course, carry with it the lowermost solids which have been deposited in the bottom of the V-shaped depressions 8, 9, 10, 13, 14, 34, etc., raising the said solids upwardly along the transversely extending trough members 16 and 35 until the said solids are brought above the respective water levels maintained in the troughs 5, 6, 32, and 33, whereupon a large portion of the water associated with the said solids will be segregated therefrom and the solids fed in a more or less dewatered condition from the various connections 55 and 57 into the receiving trough 56 from which they may be removed in any suitable manner not shown.

Under certain conditions in operating apparatus of this type, it is desirable to be able to supply an additional quantity of liquid to the material which is flowing within the troughs 1, 3, 4, 5, 6, etc., and to this end I have provided an automatic means for supplying an additional quantity of water to the mixture. This means comprises a controlling member 60 mounted in each of the trough members 5, and 6, and rigidly secured by means of the upwardly extending arm 61 to the transversely extending shaft 62. The said shaft 62 carries a pair of angularly disposed beam members 63 carrying the sliding weights 64, the whole constituting a sort of bell crank adapted through connections 65 rigid with the shaft 62 and the rod 66 pivoted thereto, to control the supply valve 67, see Fig. 2. This said valve 67 may be fed from a suitable supply pipe 68 and is adapted to distribute water or other liquid through the pipes 69 and 70 to the discharge nozzles 71 and 72, located respectively over the troughs 5, 6, 32, and 33, as will be clear from the drawings.

So long as the normal quantity of liquid is flowing through the troughs 5 and 6 the pressure thereof against the members 60 will tend to force the same toward the right, as seen in Fig. 2, thereby normally holding the valve 67 in a substantially closed position. However, should the flow of material through the troughs 5 and 6 for any reason become lessened, the pressure against the members 60 will likewise decrease, whereupon the weights 64 on the beams 63 will cause the shaft 62 to oscillate through the arc of a circle in a clockwise direction, as seen in Fig. 2, and through the connections 65 and 66 will cause the valve 67 to open, thereby permitting water or other liquid to flow from the supply pipe 68 through the discharge pipes 69 and 70 to the nozzles 71 and 72 and into the troughs 5, 6, 32, and 33, as will be readily apparent.

This increase of liquid will, of course, increase the pressure against the members 60, whereupon they will again be forced toward the right, as seen in Fig. 2, and as soon as a certain predetermined amount of water has been introduced into the trough members, the pressure against the member 60 will be sufficient to overcome the resistance of the weights 64, whereupon the valve 67 will be closed, thus cutting off the additional water supply.

It is obvious that those skilled in the art may vary the details of construction, as well as the arrangement of parts without departing from the spirit of the invention, and therefore, I do not wish to be limited to the above disclosure, except as may be required by the claims.

What I claim is:

1. In an apparatus of the class described the combination of a liquid passage provided with a plurality of depressions adapted to facilitate the settling of solids suspended in said liquid; means adapted to supply an additional quantity of liquid to said passage; automatic means actuated by the flow of liquid through said passage for controlling said supply means; means comprising inclined screw conveyers adapted to remove the solids from said depressions and to raise them above the normal liquid level in said passage; and means adapted to receive said solids from said conveyers, substantially as described.

2. In an apparatus of the class described the combination of a liquid passage provided with a plurality of depressions adapted to facilitate the settling of solids suspended in said liquid; means adapted to supply an additional quantity of liquid to said passage; automatic means for controlling said supply means; means comprising inclined screw conveyers adapted to remove the solids from said depressions and to raise them above the normal liquid level in said passage; means comprising a fluid motor adapted to be actuated by the flow of liquid along said passage, for rotating said conveyers; and means adapted to receive said solids from said conveyers, substantially as described.

3. In an apparatus of the class described the combination of a liquid passage provided with a plurality of depressions adapted to facilitate the settling of solids suspended in said liquid; means adapted to supply an additional quantity of liquid to said passage; automatic means comprising a valve, a pivoted member mounted in said passage, and connections between said member and valve for controlling said supply means; means comprising inclined screw conveyers adapted to remove the solids from said depressions and to raise them above the normal liquid level in said passage; means comprising a fluid motor adapted to be actuated by the flow of liquid along said passage, for rotating said conveyers; and means adapted to receive said solids from said conveyers, substantially as described.

4. In an apparatus of the class described, the combination of a liquid passage provided with a plurality of depressions adapted to facilitate the settling of solids suspended in said liquid; a second liquid passage, also provided with a plurality of depressions, disposed below said first passage; connections between said passages; means associated with each of said depressions adapted to remove solids deposited therein, and to elevate them above the normal liquid levels of the respective passages; a fluid motor mounted in said connections and adapted to be actuated by the flow of liquid therethrough; and means for transmitting power from said motor to said elevating means, substantially as described.

5. In an apparatus of the class described the combination of a liquid passage provided with a plurality of depressions adapted to facilitate the settling of solids suspended in said liquid; a second liquid passage, also provided with a plurality of depressions, disposed below said first passage; connections between said passages; means comprising screw conveyers associated with each of said depressions adapted to remove solids deposited therein, and to elevate them above the normal liquid levels of the respective passages; means adapted to supply an additional quantity of fluid to said passages; a fluid motor mounted in said connections and adapted to be actuated by the flow of liquid therethrough; and means for transmitting power from said motor to said elevating means, substantially as described.

6. In an apparatus of the class described the combination of a liquid passage provided with a plurality of depressions adapted to facilitate the settling of solids suspended in said liquid; a second liquid passage, also provided with a plurality of depressions, disposed below said first passage; connections between said passages; means comprising screw conveyers associated with each of said depressions adapted to remove solids deposited therein, and to elevate them above the normal liquid levels of the respective passages; means adapted to supply an additional quantity of fluid to said passages; automatic means controlled by the flow of liquid through said passages, adapted to control said supply means; a fluid motor mounted in said connections and adapted to be actuated by the flow of liquid therethrough; and means for transmitting power from said motor to said elevating means, substantially as described.

In testimony whereof I affix my signature.

SAM R. PURYEAR.